US008551197B2

(12) United States Patent
Woods et al.

(10) Patent No.: US 8,551,197 B2
(45) Date of Patent: Oct. 8, 2013

(54) STEAM REFORMING UNIT

(75) Inventors: Richard Root Woods, Irvine, CA (US); Brook Forest Porter, Playa Vista, CA (US); Kandaswamy Duraiswamy, Huntington Beach, CA (US); Leonard Weschta, Long Beach, CA (US); Christian Hulteberg, Malmo (SE)

(73) Assignee: Intelligent Energy, Inc., Long Beach, CA (US)

( * ) Notice: Subject to any disclaimer, the term of this patent is extended or adjusted under 35 U.S.C. 154(b) by 1450 days.

(21) Appl. No.: 12/090,325

(22) PCT Filed: Oct. 17, 2006

(86) PCT No.: PCT/US2006/040997
§ 371 (c)(1),
(2), (4) Date: Aug. 19, 2008

(87) PCT Pub. No.: WO2007/047898
PCT Pub. Date: Apr. 26, 2007

(65) Prior Publication Data
US 2009/0220394 A1 Sep. 3, 2009

Related U.S. Application Data

(60) Provisional application No. 60/727,636, filed on Oct. 17, 2005, provisional application No. 60/829,483, filed on Oct. 13, 2006.

(51) Int. Cl.
*B01J 7/00* (2006.01)
*B01J 8/00* (2006.01)
*C01B 6/24* (2006.01)

(52) U.S. Cl.
USPC .................... 48/61; 423/644; 422/625

(58) Field of Classification Search
USPC .................... 48/61; 422/625; 423/644
See application file for complete search history.

(56) References Cited

U.S. PATENT DOCUMENTS

| 5,980,843 | A | 11/1999 | Silversand | |
|---|---|---|---|---|
| 6,238,815 | B1 * | 5/2001 | Skala et al. | 429/424 |
| 6,835,354 | B2 | 12/2004 | Woods et al. | |
| 2002/0102188 | A1 * | 8/2002 | Hsu et al. | 422/168 |
| 2004/0099712 | A1 * | 5/2004 | Tonkovich et al. | 228/193 |

OTHER PUBLICATIONS

International Search Report and Written Opinion from corresponding International App. No. PCT/US2006/040997.

* cited by examiner

*Primary Examiner* — Matthew Merkling
(74) *Attorney, Agent, or Firm* — Baker Hostetler, LLP

(57) ABSTRACT

A hydrogen generation system is disclosed that includes an integrated steam reforming reactor. The reactor has an overall cylindrical shape, receives a reformate and separately receiving a combustion gas mixture. The reactor includes a plurality of reforming stages arranged in a stacked series of disc shaped stage configuration, wherein each reforming stage has a disc shaped combustion portion adjacent a disc shaped catalyst pack through which the reformate passes, wherein the reformate is directed axially between stages and radially within each stage; and the combustion mixture is directed radially between groups of stages and circumferentially within each stage.

20 Claims, 7 Drawing Sheets

STEAM REFORMING UNIT

CROSS-REFERENCE TO RELATED APPLICATIONS

This application is a U.S. national stage filing under 35 U.S.C. 371 of International Application No: PCT/US2006/040997, filed on Oct. 17, 2006, which claims the benefit of U.S. Application No. 60/727,636, filed on Oct. 17, 2005 and U.S. Application No. 60/829,483, filed on Oct. 13, 2006. The entire teachings of the referenced Applications are incorporated herein by reference.

BACKGROUND

1. Field

This disclosure relates to hydrogen generation systems and, more particularly, to a compact integrated steam reformer apparatus for incorporation into compact steam reforming hydrogen generator systems.

2. General Background

A hydrogen generation unit (HGU) or system typically involves a steam reforming method that includes a combination of thermo-chemical processes that convert a fuel-steam mixture into a hydrogen-rich gas mixture typically composed of hydrogen ($H_2$), carbon monoxide (CO), carbon dioxide ($CO_2$), methane ($CH_4$), water vapor ($H_2O$) and other gases depending on the composition of the fuel feedstock. Typically, this mixture being produced is known as a reformate. For many applications this reformate stream is then passed to a hydrogen purification unit in which 60% to 90% of the hydrogen is separated into a relatively pure hydrogen stream (99+% $H_2$) and an off-gas stream consisting of the other species in the reformate mixture.

A thermal cracking reactor may be used to decompose fuel into hydrogen and other compounds. This decomposition may be done in the presence of a catalyst but does not have to include catalysts. Thermal cracking-type reformers typically do not use water, and therefore also produce solid carbon or nitrogen if ammonia is utilized as the fuel. In reformers, hydrocarbon and organic fuels are typically reacted in the presence of water to produce hydrogen, carbon dioxide, and carbon monoxide. The most typical reformer used in industry is a steam reformer type reactor, but other reformers, which are known as auto-thermal reformers and partial oxidation reformers, can also use oxygen or air as a reactant. These reformers can be integrated with pre- and post-reactors such as steam generation and water gas shift (WGS) reactors to create a fuel processing system, and when integrated with hydrogen purification units, create a hydrogen generation system.

In energy applications such as fuel cell systems and hydrogen refueling stations, the efficiency of the hydrogen generation equipment can be critical to overall system economics when the energy value of hydrogen is converted into electricity. Similarly, reformers that are more compact with smaller foot prints and packaging flexibility are needed to reduce equipment cost and enhance the cost effectiveness of integrated systems. In addition, fuel cell and hydrogen refueling applications are not homogeneous in capacity. Some applications require only a few kilowatts and some require several hundred kilowatts. As a result, a reformer engineered for 25 kW applications must be completely re-engineered for a 2 kW or a 100 kW application. What the market needs are reformers with greater efficiency, enhanced compactness, and improved modularity.

SUMMARY OF THE DISCLOSURE

The present disclosure is directed to a steam reforming system and method for use in hydrogen generation systems. A hydrogen generating system that utilizes hydrocarbon compounds such as conventional fuel oils, for example, preferably utilizes a reforming system to extract hydrogen. In this reforming process, the reforming reaction is endothermic, which means heat is required for the reaction to proceed. The reformer feed is heated indirectly to a superheated temperature that permits the reformer feed to decompose releasing hydrogen that is then separated from the reformate. Combustion of fuel gases in a combustion heat exchanger is used to raise the reformate temperature to the high temperatures needed. Then the reforming reaction occurs when the reformer feed is heated and passed through catalyst beds to decompose the feed into simpler constituent gases. Typical compact reformers that enable high rates of heat transfer are based on micro-channel and plate heat exchangers and are usually rectangular or square in design, causing failures due to thermal stress at the diffusion bonded or welded corners. The present disclosure is particularly focused on a novel integrated reforming reactor which includes a plurality of reforming and combustion stages arranged in a stacked series configuration to form a cylindrical reforming reactor module. Each reforming stage has a disc shaped combustion portion adjacent to a disc shaped catalyst pack through which the reformate passes, wherein the reformate is directed axially between stages and radially within each stage; and the combustion mixture is directed radially between groups of stages and circumferentially within each stage.

The combustion portion of each stage has a pair of opposing disc shaped plates each having a flat heat exchange surface and an opposite surface having a plurality of concentric ribs formed thereon and a central axial bore therethrough. The pair of disc shaped plates is mated together with the concentric ribs interleaved to form arcuate concentric passages extending from a first side edge of the pair of plates to an opposite side edge of the pair of plates. Each mated pair of plates forming the combustion portion has a tapered entrance passage and an opposite tapered exit passage formed between the side edges and the ends of the interleaved ribs for receiving and exhausting the combustion gas. The end surfaces of each of the ribs contact the opposite plate surface so as to seal each of the arcuate passages. The surface of these ribs are specially treated and catalyzed to promote combustion reaction as described by Silversand in U.S. Pat. No. 5,980,843.

The reforming catalyst packing preferably includes a flat disc shaped diverter plate sandwiched between two sets of catalyst screens. Each catalyst pack preferably has a series of catalyst screens sandwiching the diverter plate.

The combustion portion has a central bore therethrough through which reformate passes to axially enter an adjacent catalyst pack. The reformate is directed radially through the catalyst first outwardly from the central bore to an outer edge of the diverter plate, around the outer edge of the diverter plate, and radially inward to the central bore of another combustion portion of an adjacent stage. The integrated reformer reactor has a plurality of these stages axially arranged to form a cylindrical module. The combustion stages are arranged in groups of three. Combustion gas flows through each group of stages in parallel and between sequential groups in series.

Other features, advantages and objects of the present disclosure will become more apparent from consideration of the following detailed description when taken in conjunction with the accompanying drawing figures.

DRAWINGS

DETAILED DESCRIPTION

Figure 1:
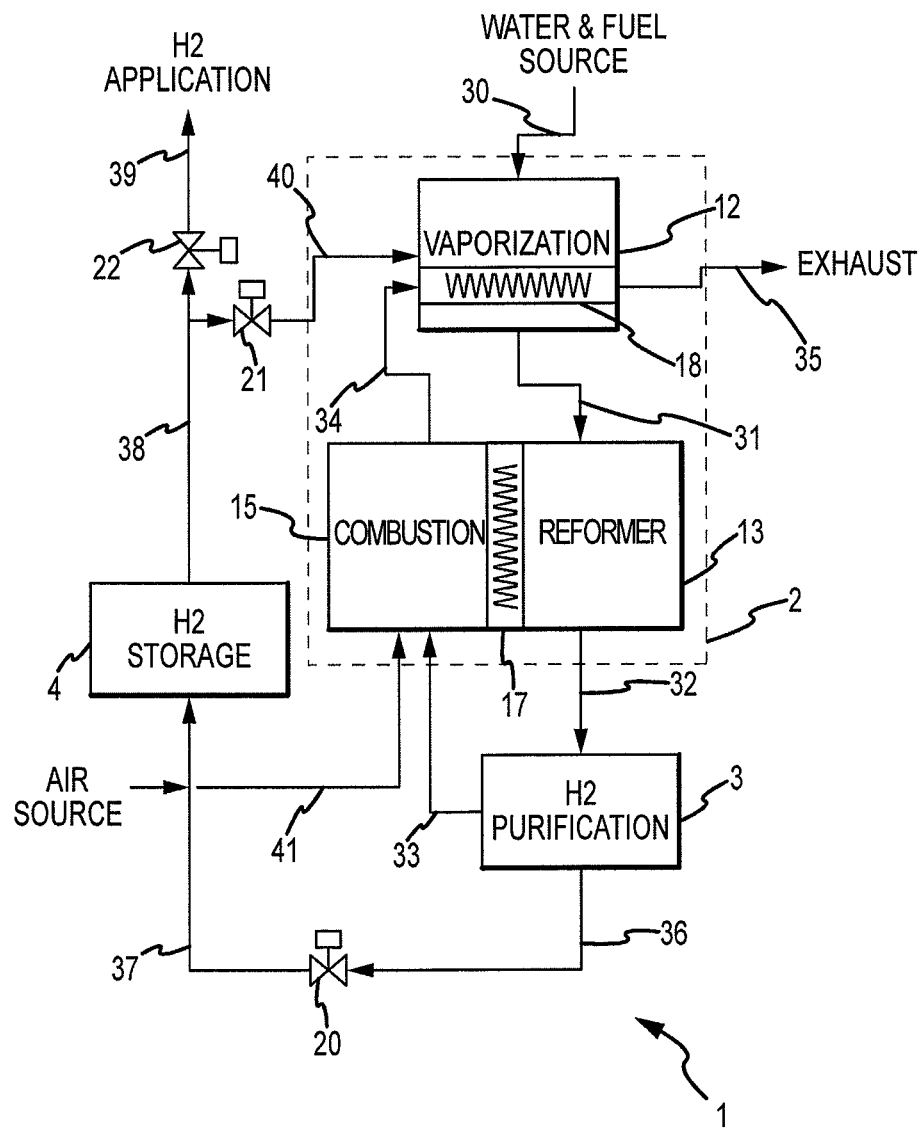
FIG. 1 is a simplified block diagram of a hydrogen generation system in accordance with the present disclosure.

Steam reforming reactors require the addition of thermal energy to the reforming catalyst to drive the reforming reaction. Reformers typically have operating temperatures in the 700° C. to 900° C. range and achieve their maximum efficiency when byproduct thermal energy is used to provide the endothermic energy required by the reforming reactions. In hydrogen generation systems the off-gas from the hydrogen purification system can be used for this byproduct thermal energy. In fuel cell system the anode off-gas can also be used as the source of this byproduct thermal energy.

This is especially important with steam reforming reactors because the thermal energy input is relatively high. Typically, in steam reforming reactors the transport of this thermal energy into the reforming catalyst is a rate and capacity limiting factor. Since this is true, the amount of heat transfer area that is designed into the reactor is a critical parameter. Combining low cost, high heat transfer areas, modularity, scalability, effective reformer side heat transfer, and compactness is a challenge.

In auto-thermal and partial oxidation reforming reactors (ATR/POX) oxygen is added into the reforming gas mixture and reacts with the fuel components to generate heat internal to the catalyst that drives the reforming process, but reduces the reforming efficiency. In hydrogen generation systems any off-gas from the purification or utilization processes based on ATR/POX can not effectively be used to help drive the reforming reactions. Typically, auto-thermal reforming and partial oxidation reforming reactors require a minimum stoichiometric ratio of approximately 0.25 or 25% of the oxygen required for complete combustion to carbon dioxide and water vapor. Woods in U.S. Pat. No. 6,835,354 B2 identified the benefits of integrating an auto-thermal reformer into the off-gas combustion unit, but this only achieved reduction down to 0.18 stoichiometric ratio, indicating that again thermal energy transport into the process is one of the keys, and therefore, what is important for steam reformers is also important for auto-thermal reformers.

Another critical design parameter in hydrogen generation systems is optimization around pressure. The combustion system needs to operate at or near ambient pressure to minimize the auxiliary energy consumed by the combustion air blower and to effectively use off-gas energy sources. The hydrogen purification process requires pressure to drive the purification process, and therefore, the heat transfer area in a hydrogen generation system must manage a high differential pressure with the reformer side at 5-15 bar(a) and the combustion side at 1-2 bar(a).

Steam reforming reactors' designs are driven by the heat transfer area between the combustion process and the reformer process and by managing the differential pressure between the reformer and combustion processes. Plate type heat exchangers maximize heat transfer surface area in compact and scalable units. Round structures are used to maximize pressure integrity especially at the elevated temperatures of the reformer process. Reformer process side heat transfer is effective when the catalyst layer thickness is less than about 30 mm and preferably less than 10 mm. These values are dependent on the heat transfer characteristics of the catalyst packing or package that is utilized.

Combustion process designs are driven by high surface areas, finned construction, and minimized laminar flow thickness between heat transfer surfaces which impacts the effectiveness of heat transfer in the gas phase reformate. The preferred embodiment of an integrated reforming reactor design in this disclosure addresses all of these design considerations.

Turning now to the drawings, FIG. 1 is a simplified block diagram of a hydrogen generation system 1. The hydrogen generation system 1 primarily consists of a reformer unit 2, a hydrogen purification unit 3 and a hydrogen storage unit 4. The reformer unit 2 consists of a reformer catalyst section 13, a catalytic combustion or combustor section 15, and a vaporizer section 12. The reformer catalyst section 13 is in thermal contact with the combustor section 15 through heat transfer surface 17. Vaporizer section 12 also has a heat exchanger surface 18.

During normal operation of the system 1, fuel and water 30 enter the reformer unit 2 and into the vaporizer section 12 at a pressure of around 2-100 bar(a), more specifically around 3-10 bar(a) where heat from combustion exhaust gases from the combustor section 15 passes at a pressure of around 1-2 bar(a) through the heat exchange channels in the vaporizer section 12. Fuel and/or water 30 may or may not be pre-heated and pre-vaporized using other sources of heat prior to entering vaporizer section 12. This heat causes the liquid water and fuel to vaporize into a vaporized fuel/steam mixture before it passes through connection 31 and into the reformer catalysts section 13. The hot vaporized fuel/steam mixture enters the reformer catalyst section 13 and reacts on the catalyst in the reformer catalysts section 13 to form a hydrogen rich reformate gas stream that exits the catalyst section 13 through connection 32. This hydrogen rich reformate gas stream contains excess water vapor. The excess water vapor is condensed from the reformate gas in a condenser (not illustrated in schematic of FIG. 1), typically down to a dew point below 70° C. This partially dried reformate gas stream flows into the hydrogen purification unit 3 in which pure hydrogen gas is separated from the other gases in the reformate stream. The pure hydrogen gas passes through connection 36 and the other gases or off-gas stream separated from the pure hydrogen gas pass through connection 33 and exit the hydrogen purification unit 3.

The exiting off-gas stream still contains combustible species including some hydrogen. This off-gas stream flows to the combustor section 15 in the reformer unit 2 where it is mixed with oxygen (typically air) introduced through connection 41 to form a combustible mixture that reacts or combusts in the combustor section 15. This combustion generates heat that is transferred through heat exchange surface 17 to the reformer catalyst section 13 to provide the heat needed by the reformation catalytic reactions.

Warm combustion exhaust gas flows from the combustor section 15 through connection 34 to the heat exchanger 18 which is in thermal contact with the water and fuel mixture entering the vaporizer section 12 through connection 30. After releasing its thermal energy the combustion exhaust gas passing through the heat exchanger 18 exits the system through exhaust connection 35.

At the same time, the pure hydrogen stream from the hydrogen purification unit 3 passes through connection 36 and valve 20, and through connection 37 enters the hydrogen storage unit 4 where it is stored. Hydrogen may then be drawn from the storage unit 4 through the connections 38 and 39 via valve 22 to the external application where it is used. Startup valve 21 is closed during normal operation. Isolation valves 20 and 22 are open to flow during normal operation.

During normal operation the control of temperatures, temperature profiles, pressures, water to fuel ratios, and other parameters maintains stable operation of the reforming process. This implies that desired reactions such as the conversion of liquid hydrocarbon fuels ($-CH_2-$)$n$, where n represents the length of the typical hydrocarbon chain, and/or methane ($CH_4$) are promoted by the temperatures, pressures, composition mixtures, and catalyst environments within the reformer. In general, the desired steam reactions for hydrocarbon type fuels are the following:

$$CH_4 + H_2O \leftarrow\rightarrow CO + 3H_2$$

$$CH_4 + 2H_2O \leftarrow\rightarrow CO_2 + 4H_2$$

$$CO + H_2O \leftarrow\rightarrow CO_2 + H_2$$

$$(CH_2)n + n(H_2O) \leftarrow\rightarrow n(CO) + (2nH_2)$$

$$(CH_2)n + (2nH_2O) \leftarrow\rightarrow n(CO_2) + (3nH_2)$$

In general, the undesired reactions for similar fuels are the following:

$$CH_4 \leftarrow\rightarrow C + 2H_2$$

$$2CO \leftarrow\rightarrow C + CO_2$$

$$(CH_2)n \leftarrow\rightarrow (C)n + (nH_2)$$

This is a very simplistic representation of the steam reforming equilibrium reactions which can involve much more complex interactions and step reactions, especially when processing complex commercial fuels such as natural gas, liquid petroleum gas, gasoline, kerosene, diesel, and others. Some of these fuels contain non-saturated hydrocarbons and aromatic compounds, whose double bonded carbons and complex ring structures can promote the formation of solid carbon. Consequently, the water and fuel source that is vaporized must be maintained at an extremely high temperature in the reactor 2 such that formation of solid carbon is prevented. It has been found that maintaining a ratio of 3:1 water to carbon is necessary to prevent formation of coke, i.e., carbon in the unit.

Figure 2:
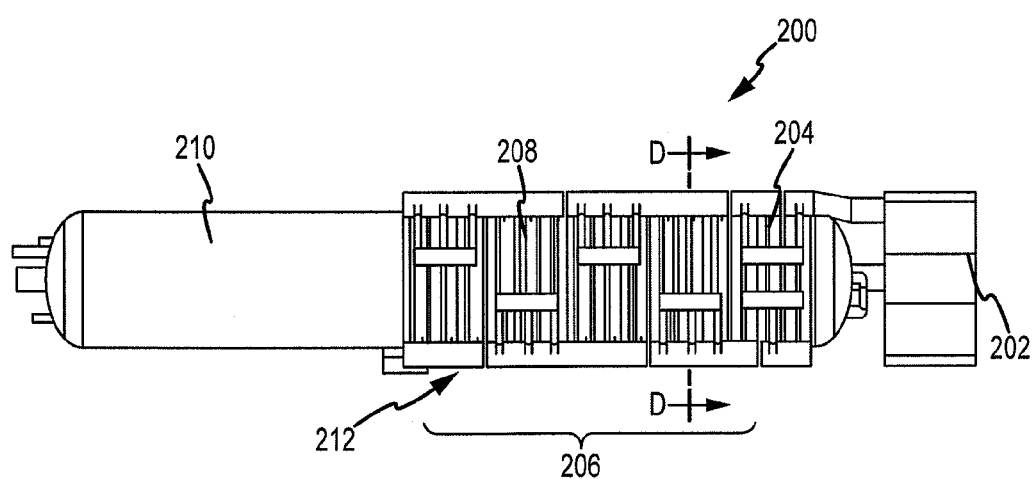
FIG. 2 is a side view of an integrated thermal reforming reactor assembly incorporating an integrated reformer module in the system shown in FIG. 1 in accordance with the present disclosure.

An integrated thermal reforming reactor assembly 200 is separately shown in a side view in FIG. 2. The assembly 200 includes a preheating heat exchanger 202 that receives the water and fuel source as the feed liquid mixture and raises its temperature to about 300° C. The liquid/vapor mixture is then fed into a preheater block 204 of a reformer module 206. The preheater block 204 heats the liquid/vapor mix to 700-900° C. and passes the superheated mixture of water molecules and fuel molecules into the reformer stages 208 of the reformer module 206 described in more detail below. The reformate that exits the reformer module 206 is fed to a water gas shift reactor 210 which lowers the temperature of the reformate to a more manageable temperature of around 300° C. for subsequent processing before sending the reformate to the hydrogen purification unit 3 shown in FIG. 1.

Figure 3:
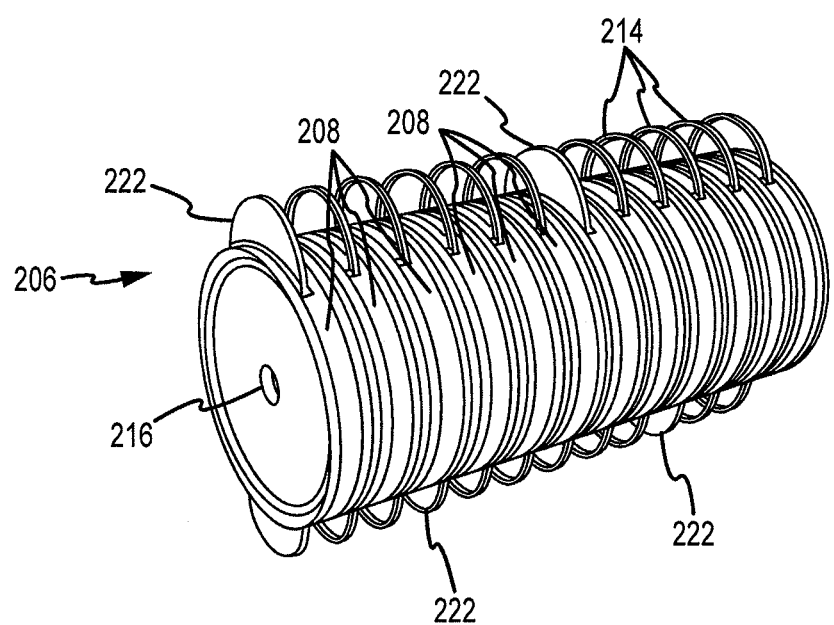
FIG. 3 is a separated perspective view of a portion of an integrated thermal reforming module in the assembly shown in FIG. 2 made of an assembly of several thermal reforming reactor stages.
Figure 4:
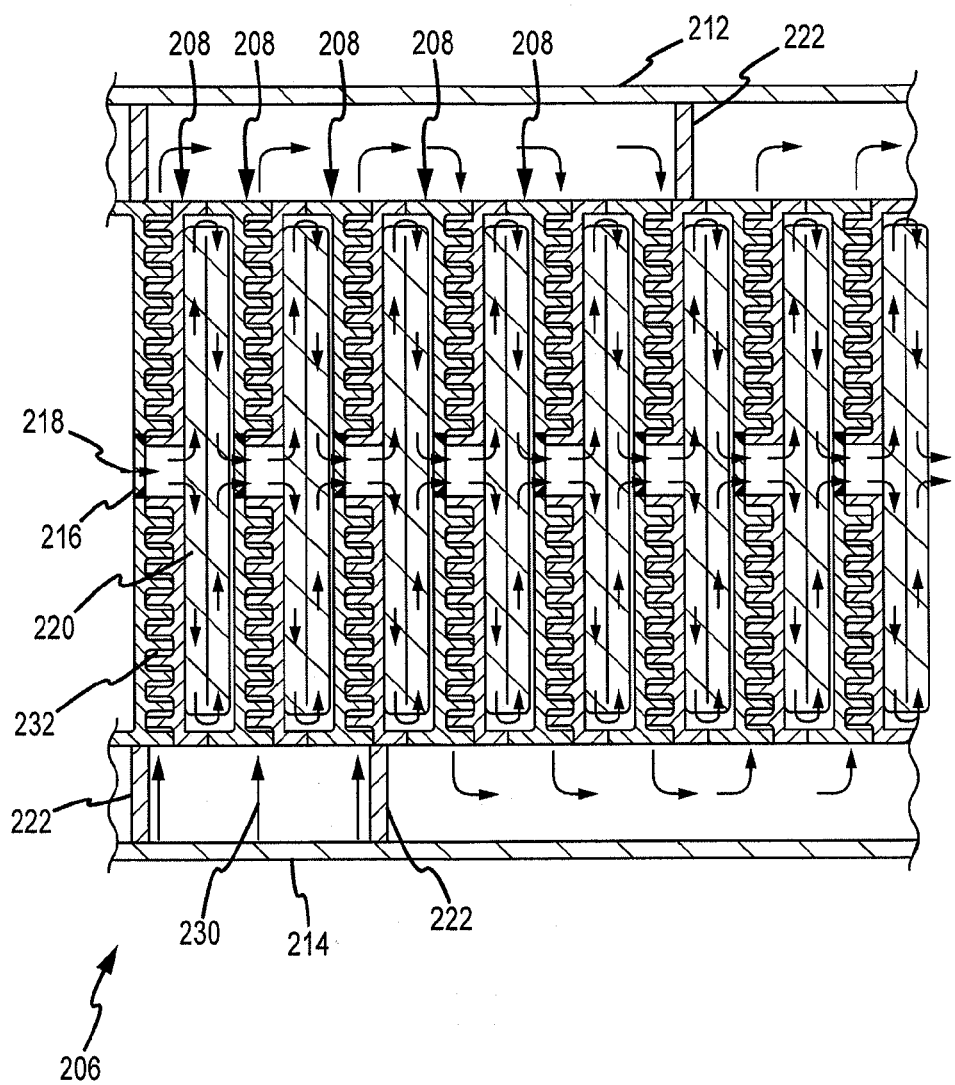
FIG. 4 is an axial cross sectional view through the module shown in FIG. 3.

An enlarged perspective external view of several stages 208 of the reformer module 206 is separately shown in FIG. 3 and an axial cross sectional view is shown in FIG. 4. In the perspective view of FIG. 3, the outer external low pressure containment cylinder has been removed as has the sheet metal manifold shroud 212, exposing the shroud supporting ears 214 and group redirector manifold partitions 222. The sheet metal manifold shroud 212 directs combustion gases to and from groups of stages 208 in the module 206. As shown, there are three stages in each group of stages 208. However, other configurations may also be designed and are within the scope of the present disclosure.

As is shown in FIGS. 3 and 4, pressurized vaporized water and fuel reformate enter a first stage 208 of the module 206 axially through the central bore 216 at a pressure preferably in a range of 2-4 atmospheres. The reformate is immediately redirected by a diverter plate to pass radially outwardly as shown by the arrows 218 through one side of a catalyst screen pack 220. The reformate then turns around and passes radially back to the center through the other side of the screen pack 220 and then axially passes to the next stage 208 through another bore 216. This axial/radial flow path is then followed repeatedly throughout the assembled stages 208 in the module 206 in series, finally exiting into the water gas shift reactor 210.

Figure 5:
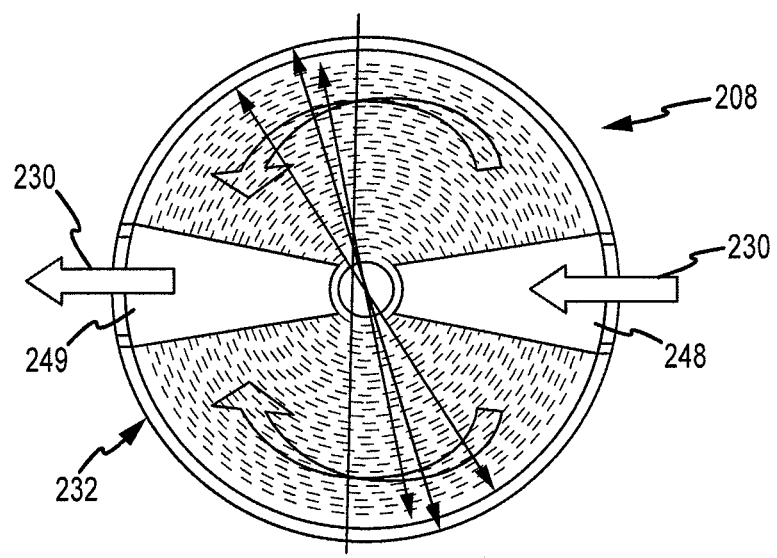
FIG. 5 is a plan view across one of the stages showing the combustion gas flow path.

At the same time that reformate is passing through the stages 208 in series, combustion gas enters the stages radially in three parallel paths 230 into and through the combustion portions 232 of a group of three stages 208. During the passage, the combustion mixture combusts, releasing heat to surrounding surfaces of the combustion portion 232. The combustion gases pass from one side of the reformer 206 to the other side through concentric passages 246 around the central bore 216 formed by interlaced concentric arcuate fins that form heat exchange surfaces to transfer heat to the reformate, as is shown in FIG. 5. The combustion gases exit the other side of the combustion portions 232 of the group of stages 208, reverse course, and pass again to the first side of the reformer 206 through the next group of combustion portions 232 of the next group of stages 208. In this serpentine fashion, combustion gas flows from one group of stages to the next group of stages until the module 206 has been transited and the combustion gases are exhausted.

Figure 6:
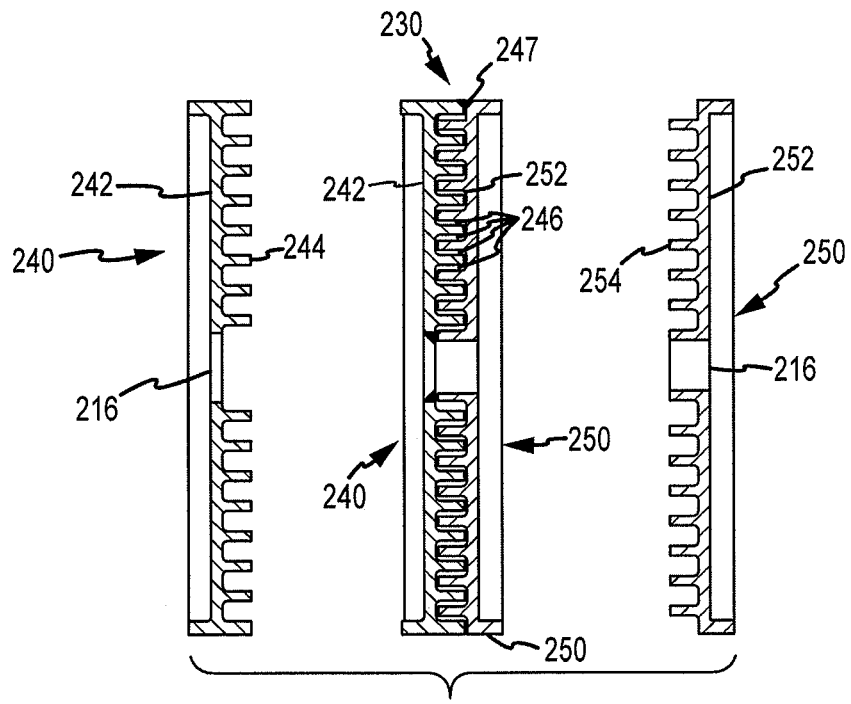
FIG. 6 is an exploded sectional view through the combustion portion of a stage.

The combustion portion 232 of each stage 208 is made up of two sandwiched combustion plates 240 and 250 as separately shown in FIG. 6. Each plate 240 has a flat planar surface 242 and 252 and a series of concentrically spaced ribs 244 and 254 projecting axially from the other surface such that when the two plates 240 and 250 are mated together the ribs 244 and 254 are interleaved to form the arcuate passages 246 as shown in FIG. 5. The end faces of each of the ribs 244 touch the corresponding surface of the opposing plate 250 between the ribs 254 and the end faces of each of the ribs 254 touch the corresponding surface of the opposing plate 240 between the ribs 244 so that the arcuate passages 246 are isolated from each other. As the combustion gas enters from the right, as shown in FIG. 5, the gas is diverted into these passages 246.

The heat exchange characteristics of the arcuate flow paths 246 result in a longer transit time for the outer passages than the passages closer to the center bore 216. Consequently, the entrance channel 248 and exit channel 249 are tapered to partially compensate for this difference. It has been found that this wedge or a curved funnel-shaped entrance and exit channel configuration results in more uniform heat transfer profiles across the surfaces of the plates 240 and 250. The flow of combustion gases through the passages 246 transfers substantial heat energy to the flat plate surfaces 242 and 252. This heat energy is then transferred into the reformate as it passes radially through the catalyst screens of the catalyst pack 220, facilitating the dissociation of species in the reformate and generation of free hydrogen in the reformate stream.

Figure 7:
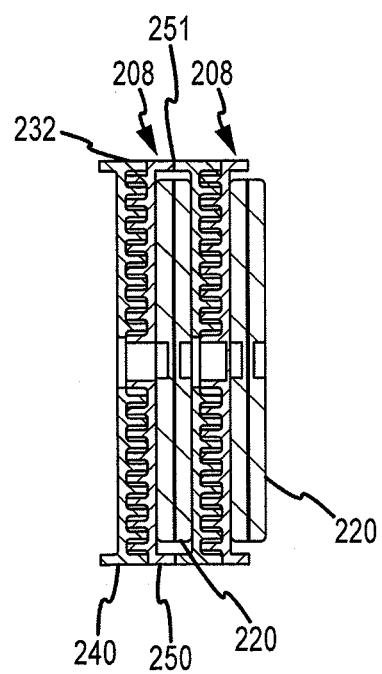
FIG. 7 is an assembled cross sectional view of two assembled stages of the reformer module shown in FIG. 4.

An assembled set of two stages 208 is shown in cross section in FIG. 7. Each stage 208 is made up of a pair of mating combustion plates 240 and 250, along with a catalyst pack 220. As is best seen in FIG. 4, the combustion gas transfers heat to the flat surfaces of the plates 240 and 250 which in turn heat the reformate passing radially in and out through the opposite sides of the catalyst pack 220. During assembly of a stage 208, plates 240 and 250 are mated together and then welded together by a circumferential weld 247 to form the combustion portion 232. A catalyst pack 220 is then placed against the surface 252 and another combustion portion 232 is assembled over the catalyst pack 220 and welded along another circumferential weld 251.

Figure 8:
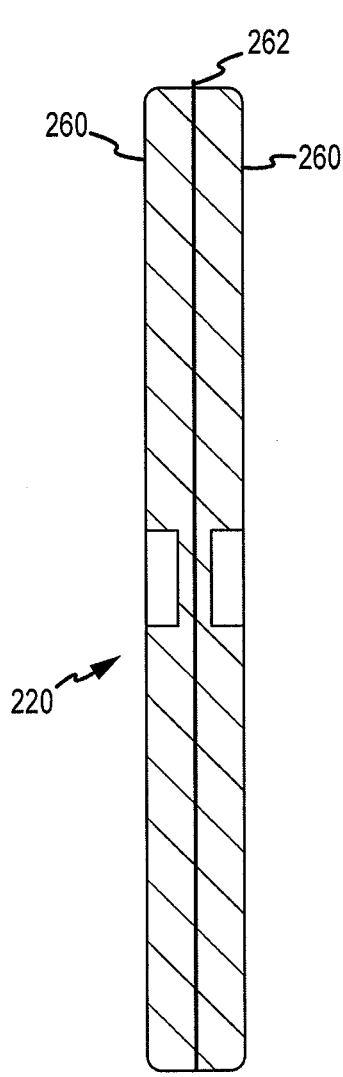
FIG. 8 is a sectional view through an exemplary catalyst screen pack.

One embodiment of a catalyst pack 220 is separately shown in FIG. 8. Each catalyst pack 220 is made up of a set of annular catalyst screens 260 positioned on opposite sides of a disc shaped diverter plate 262. The set of annular catalyst screens 260 may be separately formed into a single body having an open porous sponge configuration as shown such that reformate passing radially either outwardly or inwardly through the screens 260 effectively reacts with the catalyst material on the screen supports. This pack 220 can be prefabricated using low cost high thermal conductivity metal screen substrates to maximize heat transfer coefficient effectiveness.

Figure 9:
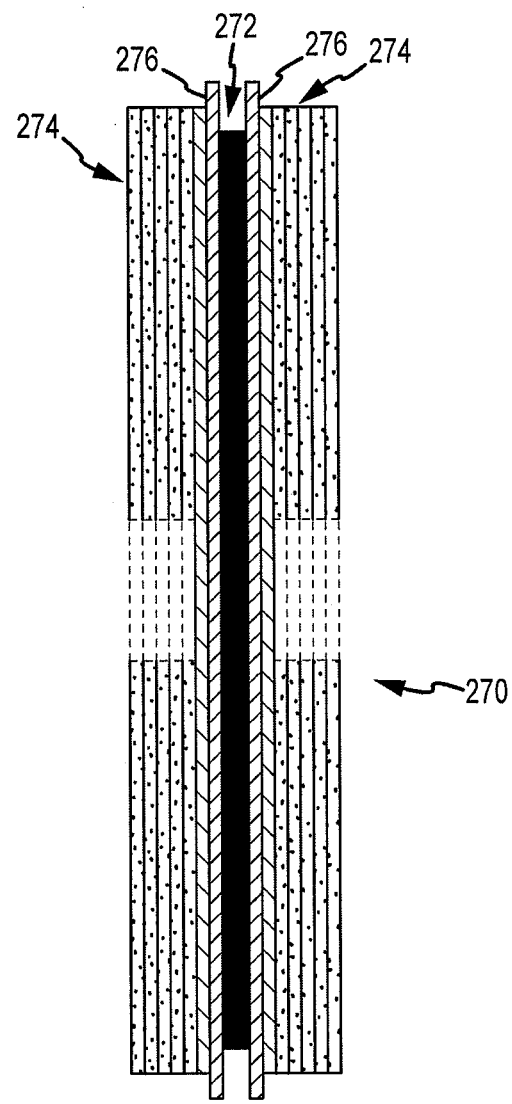
FIG. 9 is a sectional view through an alternate catalyst screen pack in accordance with the present disclosure.

An alternative pack 270 is shown in FIG. 9. In this configuration the diverter plate 272 is the same as that shown in FIG. 8. However, the screens 274 and 276 are separately stacked together to form the pack. In this construction, the inlet side of the pack may be fashioned with a different number of screens than the outlet side so that the endothermic reforming reactions are optimized as the reformate passes through the pack. In this way, for example, the designer has the capability to adjust process side heat transfer coefficients either uniformly or with enhanced process side heat exchange just before or just after the central remix and distribution zones within the bore 216.

Preferably, the diverter plate may be positioned so that it is very near the inlet reformate combustor surface to enhance heat transfer into the process reformate raising its temperature. As the reformate flows radially outward, the temperature in the reformate increases because the intrinsic diameter of the gap between the diverter plate and the combustor surface 152 is very small and because very little catalyst volume is present. At the periphery, the reformate gases turn around at the outside wall, slow down substantially, and flow radially inward through the outlet side of the catalyst package where they are cooled by the endothermic reforming reaction but are heated by the next combustor element 232.

In the reformer module 206 shown in FIG. 3, the module 206 comprises 12 stages 208 stacked and welded together. Each set of three stages includes a closed ear partition 222, as shown in FIG. 3, such that combustion gas mixture is redirected from each group of three stages 208 to the next group of three stages 208. As shown in FIG. 3, each stage 208 includes an ear 214 projecting from the edge of plate 240. Each of these ears 214 is open except for the partition ears 222. Each of the ears 214 and 222 is welded to and provides support for the sheet metal manifold 212 that is shown, in FIG. 2. This manifold 212 directs the flow of combustion gases between the groups of stages 208.

The reformer module 206 is designed has a pressure vessel primarily through the reformate pathway. In contrast, the combustion side of the module, i.e., through the combustors 232 and the manifold 212, is kept at a relatively low pressure.

What is claimed is:

1. A hydrogen generation system comprising:
   a hydrocarbon fuel supply;
   a water supply;
   a combustion gas mixture; and
   an integrated reforming reactor receiving a portion of the fuel supply for processing as a reformate and separately receiving the combustion mixture, the reactor comprising:
   a plurality of reforming stages arranged in a stacked series configuration, wherein each reforming stage has a disc shaped combustion portion adjacent a disc shaped catalyst pack through which the reformate passes, wherein the reformate is directed axially between stages and radially within each stage; and the combustion mixture is directed radially between groups of stages and circumferentially within each stage.

2. The system according to claim 1 wherein the combustion portion of each stage comprises a pair of opposing disc shaped plates each having a flat heat exchange surface and an opposite surface having a plurality of arcuate concentric ribs formed thereon and a central axial bore therethrough, and wherein the pair of disc shaped plates are mated together with the concentric ribs interleaved to form arcuate concentric passages extending from a first side edge of the pair of plates to an opposite side edge of the pair of plates.

3. The system according to claim 2 further comprising a tapered entrance passage and an opposite tapered exit passage formed between the side edges and the ends of the interleaved ribs for receiving and exhausting the combustion gas.

4. The system according to claim 2 wherein end surfaces of each of the ribs contacts the opposite plate surface so as to seal each of the arcuate passages.

5. The system according to claim 1 wherein the catalyst pack comprises a flat disc shaped diverter plate sandwiched between two catalyst screens.

6. The system according to claim 5 wherein each catalyst pack has a series of catalyst screens sandwiching the diverter plate.

7. The system according to claim 5 wherein the combustion portion has a central bore therethrough through which reformate passes to axially enter an adjacent catalyst pack.

8. The system according to claim 7 wherein reformate is directed radially through the catalyst first outwardly from the central bore to an outer edge of the diverter plate, around the outer edge of the diverter plate, and radially inward to the central bore of another combustion portion of an adjacent stage.

9. The system according to claim 1 wherein the integrated reformer reactor has a plurality of stages arranged in groups of three and wherein combustion gas flows through each group of stages in parallel and between sequential groups in series.

10. The system according to claim 9 wherein the integrated reformer reactor has at least 12 stages and includes a manifold attached to the stages to direct combustion gas between groups of stages.

11. An integrated reforming reactor for use in a hydrogen generation system, the reactor receiving a reformate and separately receiving a combustion gas mixture, the reactor comprising:
a plurality of reforming stages arranged in a stacked series configuration, wherein each reforming stage has a disc shaped combustion portion adjacent a disc shaped catalyst pack through which the reformate passes, wherein the reformate is directed axially between stages and radially within each stage; and the combustion mixture is directed radially between groups of stages and circumferentially within each stage.

12. The reactor according to claim 11 wherein the combustion portion of each stage comprises a pair of opposing disc shaped plates each having a flat heat exchange surface and an opposite surface having a plurality of arcuate concentric ribs formed thereon and a central axial bore therethrough, and wherein the pair of disc shaped plates are mated together with the concentric ribs interleaved to form arcuate concentric passages extending from a first side edge of the pair of plates to an opposite side edge of the pair of plates.

13. The reactor according to claim 12 further comprising a tapered entrance passage and an opposite tapered exit passage formed between the side edges and the ends of the interleaved ribs for receiving and exhausting the combustion gas.

14. The reactor according to claim 12 wherein end surfaces of each of the ribs contacts the opposite plate surface so as to seal each of the arcuate passages.

15. The reactor according to claim 11 wherein the catalyst pack comprises a flat disc shaped diverter plate sandwiched between two catalyst screens.

16. The reactor according to claim 15 wherein each catalyst pack has a series of catalyst screens sandwiching the diverter plate.

17. The reactor according to claim 15 wherein the combustion portion has a central bore therethrough through which reformate passes to axially enter an adjacent catalyst pack.

18. The reactor according to claim 17 wherein reformate is directed radially through the catalyst first outwardly from the central bore to an outer edge of the diverter plate, around the outer edge of the diverter plate, and radially inward to the central bore of another combustion portion of an adjacent stage.

19. The reactor according to claim 11 wherein the integrated reformer reactor has a plurality of stages arranged in groups of three and wherein combustion gas flows through each group of stages in parallel and between sequential groups in series.

20. The reactor according to claim 19 wherein the integrated reformer reactor has at least 12 stages and includes a manifold attached to the stages to direct combustion gas between groups of stages.

* * * * *